April 7, 1970        A. G. BILOTTI        3,504,913

EDUCATIONAL DART GAME

Filed June 26, 1967

INVENTOR
ANTHONY GEORGE BILOTTI

BY    *Eugene M. Bond*

ATTORNEY

United States Patent Office 3,504,913
Patented Apr. 7, 1970

3,504,913
EDUCATIONAL DART GAME
Anthony George Bilotti, 221—10 113th Drive,
Queens Village, N.Y. 11429
Continuation-in-part of application Ser. No. 383,999,
July 20, 1964. This application June 26, 1967, Ser.
No. 652,393
Int. Cl. A63b 67/00
U.S. Cl. 273—95                    3 Claims

ABSTRACT OF THE DISCLOSURE

An educational dart game is disclosed for geography, spelling and vocabulary which includes a target of either a geography map or scrambled letters, a series of darts, and a plurality of cards bearing directions for target areas and designating points to be awarded upon the successful striking of the prescribed target areas. Additionally, a pivoted spinner may be included with numerations for chance selection of the number of attempts at throwing darts for striking a designated target area. A first dart board has a frame integral therewith for holding at least one other dart board in superimposed relationship to the first board.

This application for United States Letters Patent is a continuation-in-part application of co-pending application Ser. No. 383,999 filed July 20, 1964 and now abandoned.

The present invention relates to a new and improved educational game. More particularly, the invention relates to an educational dart game of skill, decision and chance having various accessories associated therewith whereby the players may test their knowledge of various target zones in the form of geographic maps or scrambled letters.

It is recognized that the prior art contains many teachings of various dart games which require only the simple skill involved in throwing a dart into a target. Although most of these teachings are categorized as educational games, none have heretofore provided an educational game which has the combined features of skill, decision and chance.

It is a principal object of this invention, therefore, to provide an educational game which not only provides recreation and amusement but which also combines the qualities of education along with skill, decision and chance.

It is also an object of this invention to provide an educational game which not only permits amusement and entertainment but which also develops a knowledge of geography, spelling and vocabulary.

It is another object of this invention to provide an educational game suitable for recreation rooms, clubs, social or other events where a spirit of competitive skill is desired along with educational enlightenment.

It is a further object of this invention to provide a new educational game which seeks to develop coordination through dart-throwing while providing an educational stimulant which seeks to teach the participating players various features associated with geography of a particular location such as of the United States.

It is a specific object of this invention to provide an educational game which is capable of being inexpensively manufactured and which is useful as a recreational exercise enabling the participants to obtain an appreciable knowledge of geography.

These and other objects will become apparent from the following description taken with reference to the accompanying drawing in which.

Figure 6:
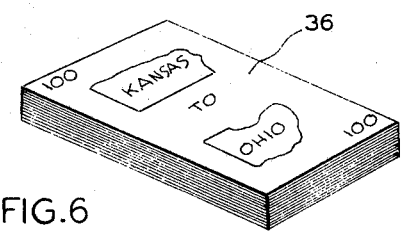
Figure 7:
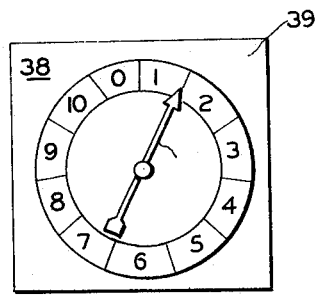

FIG. 6 is a top perspective view of a deck of cards which provide an element of chance and bearing directions for target areas with designated points to be awarded upon the successful striking of the prescribed target areas in playing the present game; and FIG. 7 is a plan view of a pivoted spinner which may be employed in providing an additional element of chance in selection of the number of throws permitted any given participant.

Figure 1:
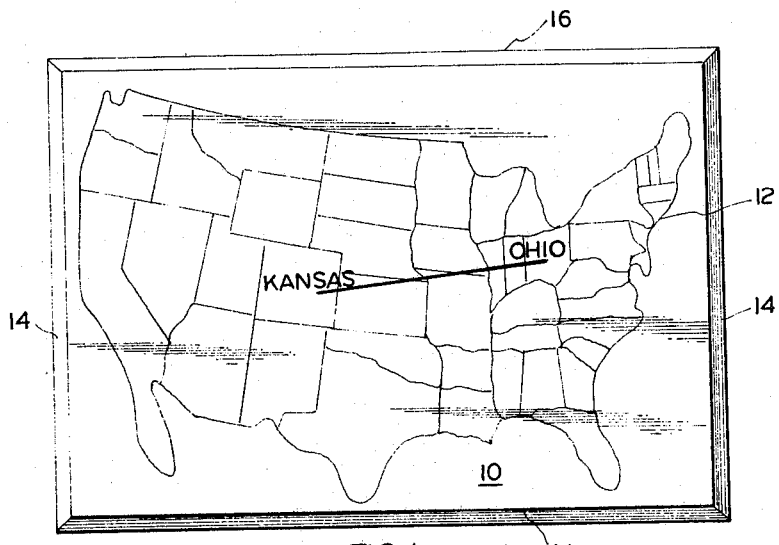
FIG. 1 is a plan view of a game board used in the practice of the present invention.

Referring to the drawing in which like reference numerals designate similar parts throughout the several views, FIG. 1 shows target board 10 which may be manufactured of a material designed to receive the constant throwing of darts without becoming disintegrated. The target board may be of any convenient size such as, for example, 18 by 28 inches. Cork base materials or other target board materials well known to the art may be used with the precise material of the board being dependent upon economic considerations. In addition to cork base materials, it has been found desirable to form the target board from pressed plastic materials such as of polyethylene beads, or the like.

Superimposed upon the surface of target board 10 is target 12 which is shown as a geographical configuration such as the map of the United States. It is recognized that any suitable map may be used as the target in playing the present game such as maps showing various countries of the world or of any particular country. The map may be printed directly on the target board or may be printed, painted or photographed on a separate sheet of material which may then be pasted to the target board with a suitable adhesive. When it is desired to provide several maps as part of the game, the basic map may be printed on the target board and alternate maps may be printed on separate sheets of materials for insertion on the target board within railing 14 provided about three sides of the target board and being formed as part of target board frame 16, which may fix in position one of the targets and which is desirably formed of plastic although wood or pressed wood may also be employed. The target board frame may be provided with a suitable means for support such as back-stand 18 for use in supporting the target on a flat, horizontal surface such as a table or the like as well as wall-hook 20 for use in suspending the target on a vertical surface such as a wall by a peg, nail or other suitable means.

Figure 2:
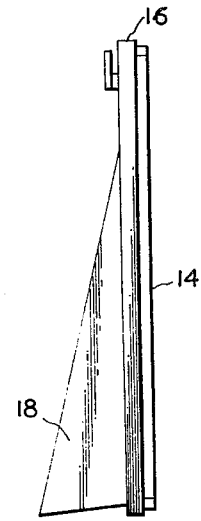
FIG. 2 is a side elevational view of the game board of FIG. 1.
Figure 3:
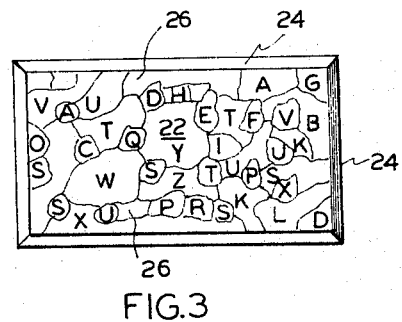
FIG. 3 is a plan view of a substitution slide board which may be interposed on the game board of FIG. 1 for use in the practice of the present invention.

FIG. 3 shows a plan view of removable slide board 22 which is provided with border 24 constructed of a similar material such as that of railing 14 of FIGS. 1–2. The border is designed to slide over target 12 and is secured by railing 14. On the surface of slide board 22, there is provided a series of target areas designated as scrambled letters of the alphabet. It is also desirable to provide target areas which contain no designated letters such as areas 26 which serve as error zones. Additional slide boards may also be provided which contain geographical areas such as of particular states of the United States, of other countries, or of the entire world.

Figure 4:
FIG. 4 is a plan view of a dart used in playing the game of the present invention.
Figure 5:
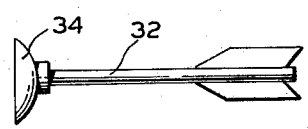
FIG. 5 is a plan view of a different kind of dart which may be used in playing the game.

Referring to FIG. 4, there is shown a plane view of a dart 28 having spiked-end 30 which may be employed as a projectile in performing the present dart throwing game. Other projectiles such as dart 32 of FIG. 5 having a suction cup 34 in place of spiked-end 30 may also be employed. Magnetic projectiles are also less desirably employed as the target must necessarily be constructed of a material having magnetic attraction.

One of the many rectangular and substantially uniform-shaped cards 36 used in playing the present game is shown in FIG. 6, each of which may bear at least one of the geographical names of a target area corresponding to that present on target 12 of FIG. 1 or a word to be spelled by use of the scrambled letters of the target of FIG. 3.

For use with the target of FIG. 1, pre-determined routes may be established on cards 28 such as is shown in FIG. 6 on which the route from Kansas, pictured within the shape of the state, is designated to Ohio, also pictured within the shape of the state. The number of points 100 to be awarded a participant who successfully completes the route is indicated in two corners of the card. Generally, from twenty to about fifty-two cards are found sufficient to provide a desirable selection of routes. When only a single state is present on the card, such as the state of Iowa, only fifty state cards are needed.

These state cards may also be employed for the scrambled letters of the target of FIG. 3 for improving spelling of the state names. For example, when a single state is presented in a card such as the state of Iowa, a participant may attempt to strike the letters of that state wih a dart projected against the scrambled letters target of FIG. 3. It is recognized that the names of the state capitals may also be included on the state cards for improving spelling of these names.

A series of separate cards merely containing words such as those typically misspelled may be included for use with the target of FIG. 3. These cards may be either combined with the cards of the states or may be separately used with the target of FIG. 3. When combined with the state cards, a participant may thus have a chance selection of either a state, or route with the target of FIG. 1 or may be required to spell out a word by use of the target of FIG. 3. By improving the participant's knowledge of spelling, the present game resultantly improves his knowledge of vocabulary. The total points may be added for successful completion of the card prescribed targets in determining a winner.

For use in providing an additional chance factor to the present game, pivoted spinner 38 of FIG. 7 is provided. The spinner may be constructed of plastic or card-board backing 39 and contains areas numbered zero to ten for designating the number of attempts a player may receive at any one try to hit the target areas of FIG. 1 as determined by the cards of FIG. 6. The number of attempts may be realized by spinning a plastic or metal indicator 40 affixed by rivet 42 to backing 39 of the spinner.

In order to understand the full scope of the present invention, various methods of playing the game will now be described. Ordinarily, the game is played by at least two individuals. In its simplest form, each player is given a pre-determined number of darts, such as, for example, three darts. After mixing the cards, a player selects a card, examines the geographical name or word to be spelled presented on it, consults the target map and attempts to hit the target area designated by the card. If a player is successful within three attempts, he is awarded the number of points designated on the selected card. Bonus points may be awarded when a player is successful with a minimum number of projectiles. If the player fails to hit the target area, no points are awarded and the next participating player receives his turn.

In one embodiment, the present game may be played as follows. In a designated order such as in alphabetical order starting with Alabama, each player attempts to place a dart or projectile within the border of the target state. In an alternate form of this embodiment, the target areas consist of scrambled letters of the alphabet which players attempt to form words from those letters struck by darts.

In the preferred method of playing the present game, the player draws a card as previously indicated which card is designated with a particular route such as from Ohio to Kansas. Although a pre-determined number of darts may be employed, it is found more desirable to employ a pivoted spinner for selecting by chance the number of attempts a player receives to complete the route. For example, when a route from Ohio to Kansas is selected by a card, the player spins the pivoted spinner and receives eight attempts to complete the route. The first dart must then strike Ohio 44, the next dart Indiana 46, then Illinois 48, Iowa 50, Missouri 52, Nebraska 54 and finally Kansas 56. Should a player fail to complete the route with the designated number of tries, the next player selects a card and attempts to complete his route. Whenever a player is unsuccessful in completing his route, upon receiving his next chance, he spins the pivoted spinner to select the number of new attempts and so forth until the route is completed. Upon completion of a route, the designated points are awarded and a new card is selected with the procedure being repeated. The player having the greatest number of points is designated as the winner.

To properly track a particular route, small tacks may be inserted in positions where hits are realized within a particular route. In this fashion, the direction of travel may be clearly indicated. Should a participant hit an improper target zone outside the designated route of travel, no tack is entered in such position.

It will be apparent to those skilled in the art that various changes and modifications may be made in the size, shape and structural details of the various accessories associated with the present game by arrangement of elements, modes, and rules of play without departing from the spirit and scope of the invention as defined by the appended claims.

What is claimed is:

1. An educational dart game of skill, decision and chance which comprises:

(A) a plurality of target boards;
 (B) a plurality of targets superimposed upon said target boards, at least one of said targets depicting a geography map, and at least one of said targets depicting scrambled letters;
 (C) a frame integral with a first target board;
 (D) said frame including means for removably holding at least one other target board in superimposed relationship with said first target board;
 (E) a plurality of darts suitable for projecting onto said targets; and
 (F) a plurality of substantially uniform cards bearing directions for target areas and designating points awarded upon the successful striking of said target areas with at least one of said plurality of darts against at least one of said target areas.

2. The educational dart game of claim 1 wherein a pivoted spinner provided with numerations for chance selection of the number of attempts at striking a target area designated by one of said substantially uniform cards is included as an element thereof.

3. The educational dart game of claim 1 wherein said frame is provided with a suitable means for support on a horizontal or vertical surface.

References Cited

UNITED STATES PATENTS 2,039,352  5/1936  Ross.
1,928,768  10/1933  Sell et al.
2,069,822  2/1937  Douglas.

FOREIGN PATENTS 692,582  6/1953  Great Britain.

ANTON O. OECHSLE, Primary Examiner

M. R. PAGE, Assistant Examiner

U.S. Cl. X.R.

273—102